United States Patent [19]

Kanter

[11] Patent Number: 4,894,244

[45] Date of Patent: Jan. 16, 1990

[54] PROCESS FOR TREATING A HYDROCARBON PLANT MATERIAL AND PRODUCT PRODUCED THEREBY

[75] Inventor: Nicole Kanter, Metz, France

[73] Assignee: S.E.T.A., Meitz, France

[21] Appl. No.: 114,076

[22] Filed: Oct. 27, 1987

[51] Int. Cl.$^4$ .......................... A23J 1/14; A23L 1/20; A23L 1/214; A23L 1/212
[52] U.S. Cl. ........................................ 426/46; 426/52; 426/62; 426/64; 426/615; 426/634; 426/637; 426/656
[58] Field of Search ...................... 426/49, 18, 44, 46, 426/50, 52, 53, 656, 48, 60, 62, 63, 634, 615, 634, 637

[56] References Cited

U.S. PATENT DOCUMENTS 3,958,015  5/1976  Gay .
4,056,636 11/1977  Muller .

Primary Examiner—Marianne Cintins
Attorney, Agent, or Firm—McAulay Fisher Nissen & Goldberg

[57] ABSTRACT

A process for treating a hydrocarbon plant substrate containing glucids and proteins is disclosed wherein said substrate is hydrolyzed with a hydrosolubilizing enzyme to form hydrosolubilized glucids, the resulting product is fermented with yeast at a pH from 3 to 5 and the fermented product is subjected to thermolysis at a temperature ranging from 80° C. to 140° C. for a period of time of 30 seconds to one hour to obtain a food product having a higher protein content than the starting plant material and a particular flavor which is dependent upon the thermolysis conditions employed.

12 Claims, 2 Drawing Sheets

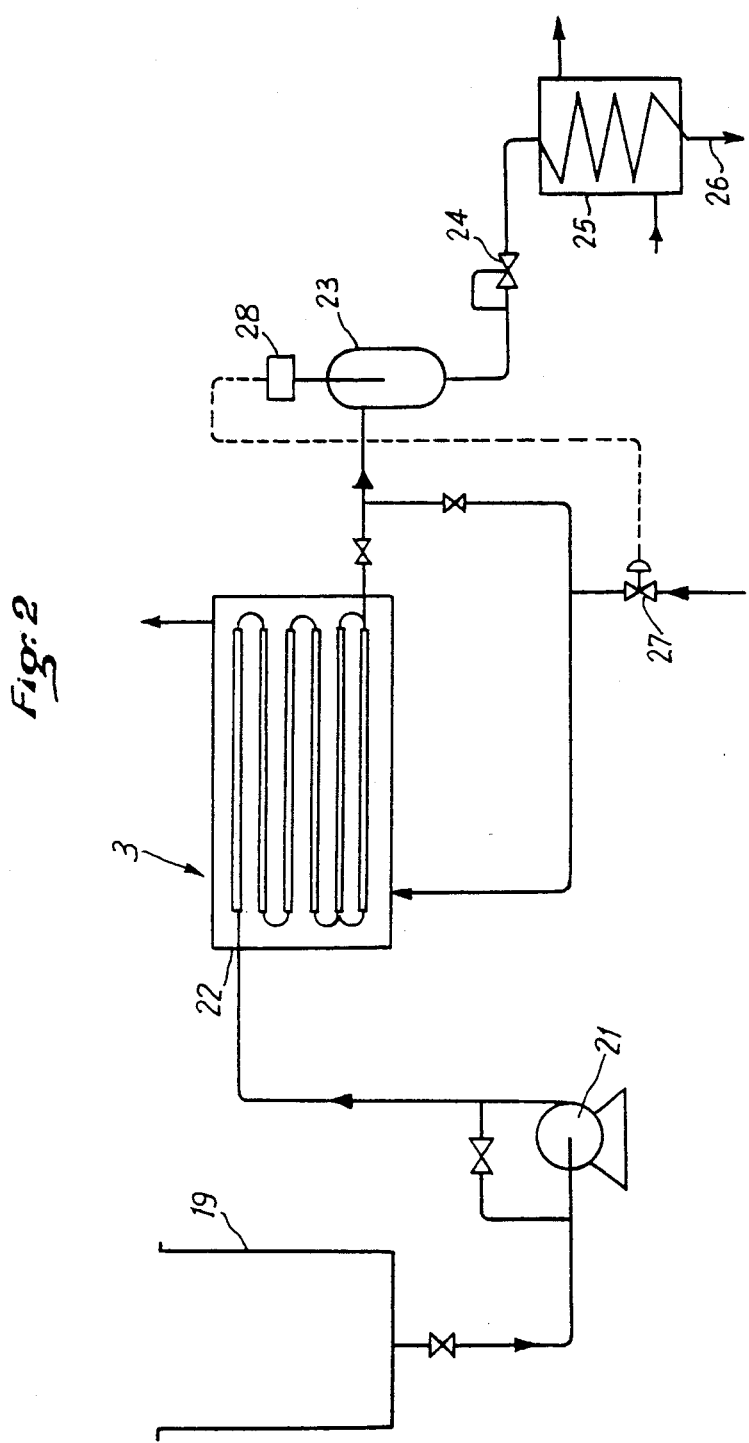

4,894,244

PROCESS FOR TREATING A HYDROCARBON PLANT MATERIAL AND PRODUCT PRODUCED THEREBY

BACKGROUND OF THE INVENTION

The present invention relates to a novel process for producing from any hydrocarbon plant substrate, a natural food product with high nutritional value, rich in flavours, proteins and B vitamins, and having particularly desirable properties, as well as to a novel food product obtained by this process and to an installation for carrying out this process A process is already known in which a raw plant material containing proteins and glucids is processed to obtain a food composition of high nutritional value, having a high protein content. This process, which is described in Gay U.S. Pat. No. 3 958 015 and which is applied more particularly to soya beans, employs in a first step, the specific action of hydrosolubilizing enzymes on the glucids of the soya bean flour and in a second step, a fermentation of the hydrosolubilized glucids, under the action of yeasts, such fermentation having for its effect to increase the protein content of the composition and a corresponding reduction of the glucid content.

SUMMARY OF THE INVENTION

The present invention relates to improvements in a process of the character desired of substantially improving the qualities of the resulting food product.

In the process of the invention a hydrocarbon-containing plant substrate is subjected to a first step of treatment by hydrosolubilizing enzymes on the glucids of this substrate, a second step fermenting of the hydrosolubilized with a yeast and then subjecting the product to a third step of thermolysis at a temperature ranging from 80° to 140° C., for a period of time ranging respectively from one hour to 30 seconds.

The product can be subjected either to conventional thermolysis, i.e. at a temperature ranging from 80° to 100° C., for a period of time ranging respectively from 1 hour to 20 minutes, or to flash thermolysis at a temperature ranging from 100° to 140° C., for a period of time ranging respectively from 20 minutes to 30 seconds.

According to a further feature of the invention, *Candida Utilis* is employed as the yeast strain for the fermentation step. This strain of yeast is perfectly suitable for the continuous production of the proteins of yeasts on an industrial scale thanks to its stability for long periods of continuous culture. The strain used has the characteristics of the species *Candida Utilis* whose description is given in "The Yeasts", edied by J. LODDER, North Holland Publishing Compagny. It is called *Candida Utilis* Ref: V-448.

A poor fermentation medium with relatively low pH, of the order of 3 to 5, is used. By poor fermentation medium, it is meant one which only contains phosphorus, potassium, sulfur and ammonia nitrogen. These conditions, namely continuous processing, a poor fermentation medium, an acid pH of the culture, and a particular strain, prevent proliferation of other microorganisms.

The continuous culture of *Candida Utilis* Ref: V-448 in the presence of a perfectly defined medium makes it possible to manufacture a product whose composition and qualities remain constant with time.

The process according to the invention may use any hydrocarbon vegetable substrate or mixture thereof as starting raw material. The following raw materials may be mentioned in particular :

- in the family of Leguminosae, considerable quantities of seeds which are used at present in human and animal food, such as broad beans, haricot beans, peas, lentils, etc.
- in the family of Solanaceae, the tuber of *Solanum tuberosum*, the potato, which is of course consumed worldwide, and
- in the family of Eurphorbiaceae, cassava (*Manihot esculenta*) which yields a root from which manioc or tapioca is obtained, which is a staple food of the countries of Africa, South America, etc.

The process according to the invention makes it possible to obtain a food product rich in proteins which has desirable properties. It has proved, in fact, to have very high emulsifying power, virtually twice as great as that of casein, an emulsifying agent currently used in the food industry. The product obtained also lends itself well to agglomeration, in order to produce tablets.

It has a good swelling power and a good ability to fix the lipids.

Depending on the conditions of processing and in particular of carrying out the thermolysis, food products having varied and pleasant tastes may be obtained.

BRIEF DESCRIPTION OF THE DRAWINGS

The invention will be more readily understood on reading the following description with reference to the accompanying drawings, in which:

FIG. 2 is a block diagram of the thermolysis part of the installation.

DESCRIPTION OF THE PREFERRED EMBODIMENTS

Figure 1:
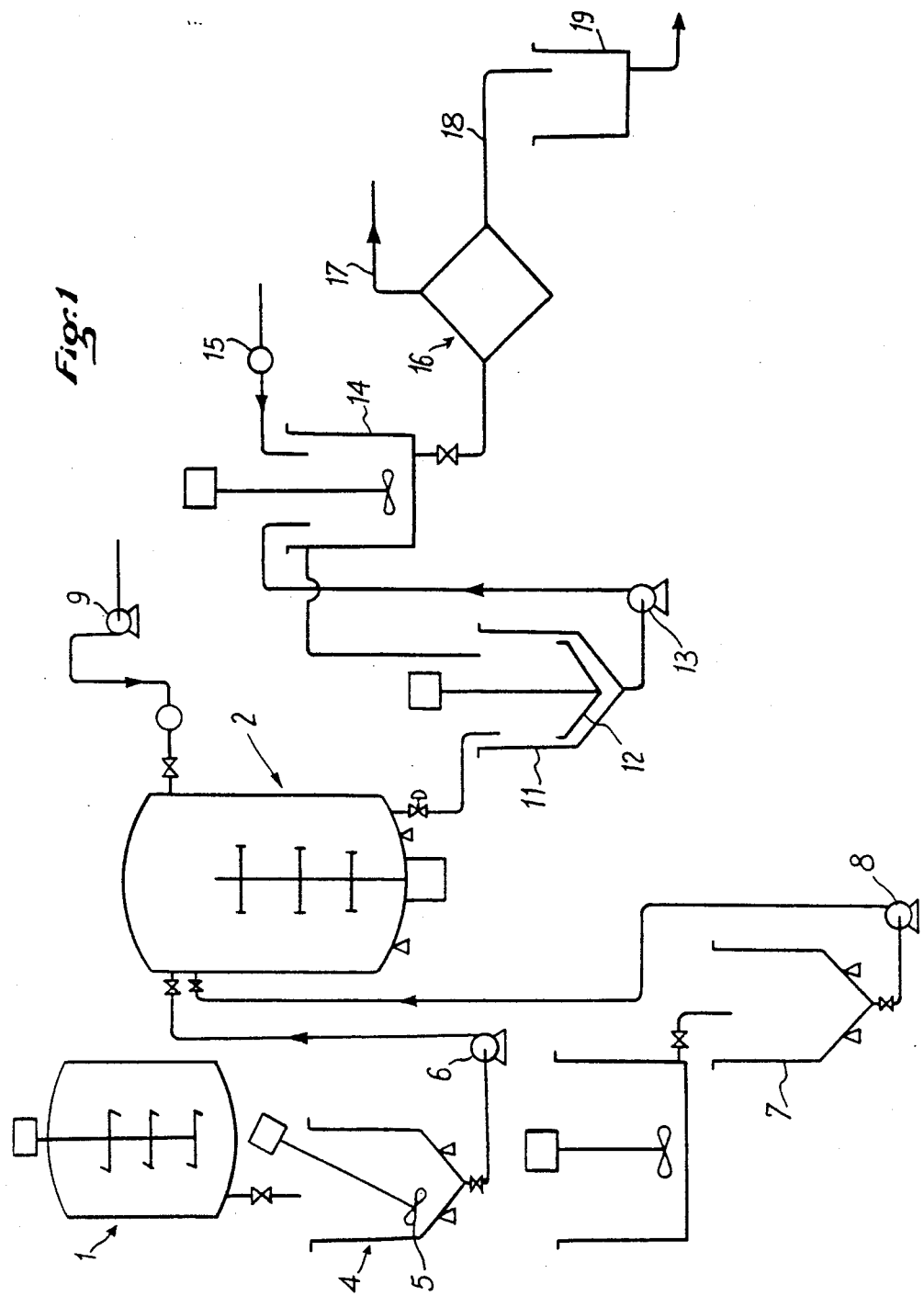
FIG. 1 is a block diagram of the hydrolysis and of fermentation chambers of an installation carrying out the process according to the invention.

Referring now to the drawings, FIGS. 1 and 2 show that the process according to the invention is carried out in an installation comprising a hydrolyis reactor 1, a fermentation reactor 2 and an in-line thermolysis stage 3.

In the following specification, the processing, using as the hydrocarbon vegetable substrate, a manioc flour orginally containing 2% of proteins is an example of the process. This manioc flour is introduced into the hydrolysis reactor 1 at the same time as an enzyme such as amylase. The first step of hydrolysis is effected for example at a temperature of 90° C., for one hour, in the hydrolysis reactor 1. A hydrolyzer buffer vat 4 fitted with a stirrer 5 capable of varible speeds and in which takes place the saccharification of the amylaceous substrate with an enzyme such as amyloglucosidase, is disposed between the hydrolysis reactor 1 and the fermentation reactor 2. The hydrolyzate is injected in the fermentation reactor 2 by means of a pump. The buffer vat 4 is placed on a weighing system to determine the amount of the hydrolyzate injected.

By monitoring the weight of the buffer vat of the concentrated inorganic medium 7, identical to the hydrolyzer buffer vat 4 but without stirring means, it is possible to monitor the flowrate of injection of inorganic medium into the fermenter. Concentrated medium is injected into the fermentation reactor 2 via a pump 8. The inorganic medium of fermentation used in the fermentation step is a poor medium with pH of the order of 3 to 5, for example 3.5 which contains solely phosphorus potassium, sulfur and ammonia derived nitrogen.

The rate of dilution used, which represents the ratio of the flowrate of injection of the inorganic medium and of the carbon substrate on the liquid volume present in the fermenter is 0.II h-1, and the temperature is 35° C. The dilution water of the inorganic medium is injected into the fermentation reactor 2 by means of a pump 9.

The fermentation reactor 2 is placed on scales connected to an electropneumatic valve. This installation makes it possible to maintain constant, in the course of time, the quantity of fermentation wort inside the reactor.

The fermentation wort flows into a buffer vat 11 fitted with a stirrer 12 and this wort is taken up by a pump 13 and is sent into a washing vat 14. The washing water is introduced into vat 14 by a pump 15 and the flowrate of water is counted by means of a water meter.

The bottom of the washing vat 14 is connected to a centrifuge 16 to supply the latter with washed wort. The centrifuge 16 furnishes at its outlet, in a first pipe 17, a clear liquor and, in a second pipe 18, the cream of yeasts which is collected in a buffer vat 19.

The cream of yeasts collected in the buffer vat 19 is taken up by a pump 21 to be introduced into the thermolysis stage 3. This stage 3 comprises a heat exchanger 22 or coil in which the product subjected to thermolysis is taken to a temperature of between 80° and 140° C., the corresponding residence time in the thermolysis exchanger 22 ranging from 1 hour to 30 seconds.

The outlet of the exchanger 22 is conected to a holding vessel 23 which supplies, through a pressure regulator 24, a cold exchanger cooled by a water circulation. The final food product obtained after the conversion of the original hydrocarbon vegetable substrate emerges continuously through a pipe 26.

The temperature of the exchanger 22 is adjusted by automatic action on a vapour supply valve 27 which is controlled by a temperature indicator-regulator 28 fixed on the holding recipient 23. The whole of the thermolysis stage 3 is maintained under a sufficient pressure, via the pressure regulator 24, in order not to vapourize the liquid to be thermolyzed.

The protein content of the product obtained from an original manioc flour with 2% of proteins, has been augmented 42% by weight.

Unexpectedly, it has been observed that, depending on the conditions in which the thermolysis stage is effected, food products are obtained having different typical tastes. For example, in the case of a flash thermolysis effected in exchanger 22 at 130° C. for 2 minutes, a final product is obtained which has a meaty taste like roast chicken. If the period of thermolysis is limited to 1 minute but still at a temperature of 130° C., a product having a malty taste is obtained.

If the conditions are those of a conventional thermolysis, i.e. at 85° C. for a period of 30 minutes, a food product having a taste of liver is obtained.

The table hereinbelow gives by way of non-limiting example, the composition of a food product obtained by the processing, described hereinabove, of manioc flour:

|  | % by weight |
|---|---|
| Total nitrogen | 7.2 |

-continued

|  | % by weight |
|---|---|
| Proteins (N × 6.25) | 45.0 |
| Lipids | 5.4 |
| Cellulose | 5.6 |
| Inorganic matters | 7.1 |
| Glucids | 28.9 |
| Humidity | 8.0 |
| Sodium | 0.04 |
| Potassium | 2.2 |
| Magnesium | 0.22 |
| Calcium | 0.46 |
| Zinc | 50 ppm |
| Phosphorus | 1.36. |

Furthermore, bacteriological analysis has shown a total absence of pathoenic bacteria in the product obtained and a reduced fungus flora. The detailed results of this analysis are as follows:

| Microorganisms | number |
|---|---|
| Total flora | 100 germs/g |
| Enterobacterias | absent |
| Coliforms | absent |
| Escherichia coli | absent |
| Salmonellae | absent |
| Staphylococci | absent |
| A.S.R.T. | absent |
| Clostridium perfrigens | absent |
| Faecal streptococci | absent |
| Pseudomonas | absent |
| Moulds | 70 germs/g |
| Yeasts | 10 germs/g |

What is claimed is:

1. A process for treating a hydrocarbon plant substrate containing glucids and proteins to obtain a food product having a higher protein content than the starting plant material and a particular flavor which is dependent upon the thermolysis conditions employed, comprising the combinative steps of:
   first hydrolyzing said substrate with a hydrosolubilizing enzyme to form hydrosolubilized glucids;
   fermenting the resulting product including said hydrosolubilized glucids with a yeast at a pH from 3 to 5 and subjecting the thus fermented product to thermolysis at a temperature ranging from 80° C. to 140° C. for a corresponding period of time of 30 seconds to one hour; wherein during said thermolysis step differing flavors are obtained depending upon the selected temperature and time combinations employed.

2. The process of claim 1, wherein said thermolysis is conducted at a temperature ranging from 80° C. to 100° C., for a corresponding period of time ranging from 20 minutes to one hour.

3. The process of claim 1, wherein said thermolysis is a flash thermolysis conducted at a temperature ranging from 100° C. to 140° C. for a corresponding period of time ranging from 30 seconds to 20 minutes.

4. The process of claim 1, in which Candida Utilis Ref.: V-448 is used as the yeast strain for fermentation.

5. The process of claim 1, wherein fermentation is carried out in an organic medium containing phosphorus, potassium, sulfur and ammonia-derived nitrogen.

6. The process of claim 1, wherein the substrate is selected from the vegetal group consisting of Leguminosae, Solanaceae and Eurphorbiaceae and mixtures thereof.

7. The process of claim 2, in which *Candida Utilis* Ref.: V-448 is used as the yeast strain for fermentation.

8. The natural food product resulting from the process of claim 1.

9. A natural food product according to claim 8 having a meaty taste similar to roast chicken owing to thermolysis carried out at about 130° C. for about two minutes.

10. A natural food product according to claim 8 having a malty taste owing to thermolysis carried out at about 130° C. for about one minute.

11. A natural food product according to claim 8 having a liver taste owing to thermolysis at about 85° C. for about 30 minutes.

12. The food product of claim 8 produced from manioc flour and containing in percent by weight:

|  | % by weight |
| --- | --- |
| Total nitrogen | 7.2 |
| Proteins (N × 6.25) | 45.0 |
| Lipids | 5.4 |
| Cellulose | 5.6 |
| Inorganic matters | 7.1 |
| Glucids | 28.9 |
| Humidity | 8.0 |
| Sodium | 0.04 |
| Potassium | 2.2 |
| Magnesium | 0.22 |
| Calcium | 0.46 |
| Zinc | 50 ppm |
| Phosphorus | 1.36. |

* * * * *